United States Patent [19]

Forch

[11] 4,277,072
[45] Jul. 7, 1981

[54] SEAL FOR THE GAP BETWEEN A REVOLVING SHAFT AND THE BORE OF A HOUSING AGAINST A MIXTURE OF A LIQUID AND A GAS

[75] Inventor: Hans Forch, Birkenau, Fed. Rep. of Germany

[73] Assignee: Firma Carl Freudenberg, Weinheim an der Bergstrasse, Fed. Rep. of Germany

[21] Appl. No.: 100,749

[22] Filed: Dec. 6, 1979

[30] Foreign Application Priority Data

Dec. 15, 1978 [EP] European Pat. Off. ........ 78101712.4

[51] Int. Cl.³ .......................... F16J 15/32; F16J 15/38
[52] U.S. Cl. ...................................... 277/65; 277/82; 277/85; 277/93R; 277/96.2; 277/153; 277/165; 277/DIG. 4; 277/DIG. 6
[58] Field of Search ........ 277/DIG. 4, 81 R, DIG. 6, 277/38–41, 82, 83, 85, 93 R, 93 SD, 95, 96.2, 152, 153, 165, 58, 65

[56] References Cited

U.S. PATENT DOCUMENTS

| | | | |
|---|---|---|---|
| 1,336,428 | 4/1920 | Gothner | 277/DIG. 4 |
| 2,498,739 | 2/1950 | Magnesen | 277/40 |
| 3,101,954 | 8/1963 | Huddle | 277/39 |
| 3,443,814 | 5/1969 | Dahlheimer | 277/152 X |
| 3,682,488 | 8/1972 | Matsushima | 277/39 X |
| 4,194,748 | 3/1980 | Forch et al. | 277/DIG. 6 |

FOREIGN PATENT DOCUMENTS

| | | | |
|---|---|---|---|
| 1329274 | 4/1963 | France | 277/65 |
| 904256 | 8/1962 | United Kingdom | 277/85 |

Primary Examiner—Robert S. Ward, Jr.
Attorney, Agent, or Firm—Kenyon & Kenyon

[57] ABSTRACT

A seal to prevent the escape of a liquid and gas mixture from the gap between a rotating shaft and the bore of a housing, which includes an inner ring secured to the shaft and an outer ring secured to the outer wall of the housing bore. A flange-like member is secured to the inner ring and employed to seal the gap between the inner ring and outer ring. The flange includes liquid and gas inlets, an internal network of voids and liquid and gas outlets. The internal void network of the flange member is adapted so that during the rotation of the flange member, gas and liquid oil is suctioned into the flange through the liquid and gas inlets, and are segregated by the rotary motion of the void network of the flange into a predominantly gaseous stream and a predominantly liquid stream.

17 Claims, 4 Drawing Figures

4,277,072

SEAL FOR THE GAP BETWEEN A REVOLVING SHAFT AND THE BORE OF A HOUSING AGAINST A MIXTURE OF A LIQUID AND A GAS

FIELD OF THE INVENTION

The invention described herein relates to an oil-tight seal for the gap between a revolving shaft and the bore of a transmission or motor housing.

BACKGROUND OF THE INVENTION

Fast-rotating machine parts in transmissions or in motors are usually lubricated with an oil mist which is generated by nozzles. In order to avoid oil loss it is necessary to seal the transmission or motor housing hermetically from the external environment. In the vicinity of shaft feedthroughs, difficulties can arise if radial shaft sealing rings with a sealing lip of an elastomeric material are employed. The extremely thin film of lubrication produced during the operation of such seals, although continuously renewed, can reduce the frictional heat produced only to a limited extent.

DE-OS No. 24 27 537 discloses a seal for the gap between a revolving shaft and the bore of a housing, which includes an outer ring secured to the wall of the housing bore, and an inner ring secured to the shaft. The seal is equipped with a gap seal having return-transport ribs on the side facing the oil stream. A ring-shaped sealing lip is secured to the inner ring which, when the shaft is standing still, is biased against a radially-inwardly directed projection of the outer ring.

When the shaft is at rest, oil may penetrate through the gap seal to the vicinity of the sealing lip. However, the rotation of the shaft creates a dynamically generated back transport of oil from the vicinity of the sealing lip, through the return-transport ribs of the gap seal. Thus, as the shaft begins to rotate, the sealing zone proper increasingly shifts from the sealing lip to the gap seal. Eventually the centrifugal forces resultant from the rapid rotation of the shaft lift the sealing lip completely from contact with the outer ring. At this point the gap seal alone is responsible for the seal. With a still further increase of the speed of the shaft, oil may be essentially emptied out of the sealing gap and, undesirably, ambient air is admitted into the sealing space. This interrupts the further circulation of lubricating oil into the sealing gap. At high speeds, a heat buildup in the residual lubricating oil may result in undesirable secondary phenomena, and in the decomposition of adjacent portions of elastomeric materials.

The technical basis for the function of the seal discussed above requires a particularly high degree of precision manufacturing of every individual part of the seal, and in particular precise mutual fits under operating conditions. The requirement of high precision manufacturing results in extremely high manufacturing costs. Further, the requirement of precise mutual fit cannot be met if the shaft to be sealed runs eccentrically due to operating conditions, for example, as a result of unavoidable vibrations during shaft rotation.

BRIEF DESCRIPTION OF THE INVENTION

This invention provides a seal of simplified design which does not require the maintenance of highly precise surfaces and, yet, which insures a reliable seal from shaft standstill to very high shaft speeds. Moreover, the operation of the seal of this invention is not impaired by the eccentric rotation of the shaft within the range of normal tolerances. Depending on the design, it should, in addition, be possible to make the seal of this invention resistant to high temperatures.

More specifically, this invention provides a seal which prevents the escape of a liquid and gas mixture from the gap between a rotating shaft and the bore of a housing, which seal comprises:

(a) an outer ring means secured to the inner wall of the housing bore, (b) an inner ring means secured to the shaft, (c) a flange means for sealing the gap between said outer and inner ring means during the rotation of said shaft, said flange means having gas and liquid inlet means, an internal network of gas and liquid permeable voids, spaces or passages and gas and liquid outlet means, (d) means for transmitting the rotary motion of said shaft to said flange means, and (e) means for sealing the gap between said outer ring means and inner ring means when said shaft is at rest.

The network of passages in said flange is adapted so that during the rotation of said flange, said gas and liquid within said housing is suctioned through said flange inlet means and segregated by the rotary motion of said network into a predominantly liquid stream and a predominantly gaseous stream, and wherein said predominantly liquid stream is discharged from said flange at a point closer to said flange inlet means than said predominantly gaseous stream.

DESCRIPTION OF THE DRAWINGS

This invention will be described with reference to the following figures wherein.

DESCRIPTION OF THE INVENTION

Figure 1:
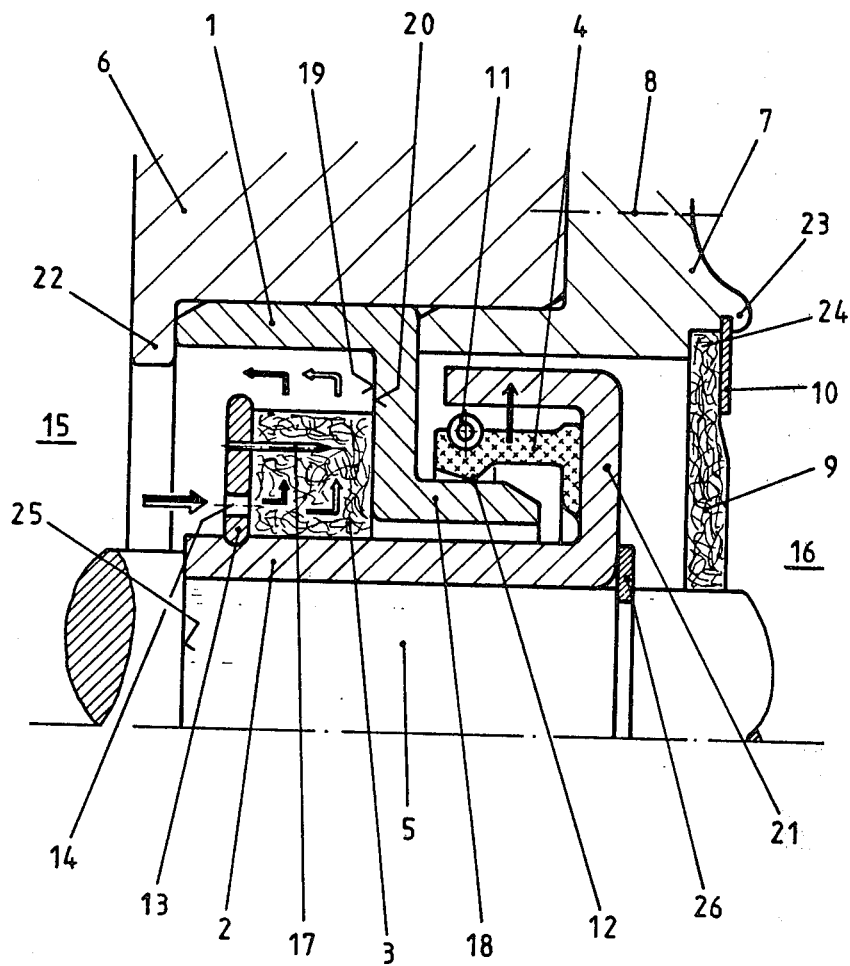
FIG. 1 is a partial longitudinal-sectional view of an embodiment of the seal in which the lip seal housing is secured to the inner ring.

With reference to FIG. 1, the seal of this invention serves to seal the space (15) containing a lubricating oil-air mist, from the outside air (16). The outer ring (1) is axially clamped between a bead (22) formed on housing wall (6), and an inwardly projecting ring (33) of the housing cover (8). The cover (8) is fastened to the outer housing wall by bolts (7), not shown.

At its end face, the cover (8) has a ring bead (23) which has an inside recess (24), which is concentrically related to the shaft (5). A felt dust washer (9) is fastened within the recess (24) by means of a clamping ring (10). The dust washer (9) slidably engages the surface of the shaft (5).

An inner ring (2) is secured to the shaft by the shaft shoulder (25) and by the clamping ring (26). The diameter of the inner ring is carefully matched to the diameter of the shaft (5) so that an air-and-liquid-tight seal is provided between the inner ring and the shaft. In order to improve the seal between the inner ring and the shaft, the inner ring may be provided with an inner lining of elastomeric material which has several ribs which are disposed axially one behind the other, and are pressed against the surface of the shaft.

A lip seal (4), which is formed from a rubber-elastic material, is directly vulcanized onto the projection (21) of the inner ring (2). The lip seal (4) has a sealing lip (12) which is biased by ring spring (11) against the outer circumference of a ring-shaped extension (18) of the outer ring (1). An elastic ring having a circular cross-section may be employed as the ring spring (11). Lubrication at the point of contact between the sealing lip and the outer ring is required only at low shaft speeds.

A flange (3) is mounted on the inner ring (2) by means of a clamping ring (13) secured to the inner ring (2). The clamping ring (13) includes several needle members (17) which are relatively uniformly spaced-apart from each other, and extend axially from the clamping ring, into the interior of the flange (3). The needle members insure that the rotary motion of the shaft is transmitted directly to the flange (3). The needle members also function to prevent the radial expansion of the flange during high shaft rotation speeds, which might occur if the flange were formed from a flexible material. The number of needle members employed, therefore, is a function of the mechanical stability of the flange member. For ordinary shaft diameters of up to 100 mm, between 3 and 12 needle members are usually sufficient.

The clamping ring (13) also includes a plurality of axial passages or inlets (14), which are distributed over the radial surface of the ring. The distance between adjacent inlets should not be larger than the diameter of the inlets, in the circumferential direction.

The flange member (3) may be formed of a resilient or elastic material, and may be slightly biased against the ring-shaped extension (19) of the outer ring (1). Due to the dynamic forces present at rapid rotation speeds, a gap can develop between the opposing faces of the outer ring extension (19) and the flange member (3) without impairing the efficacy of the seal.

The flange member (3) may be formed of polyester fibers which are cemented or clamped together, which do not absorb the oil to be sealed. The fibers may have a diameter of at least about 0.030 mm. The fabric material is densified to a relatively high degree and the maximum fiber spacing is in the order of two to four times the average filament diameter. Depending on the flow behavior of the sealed off mixture, the use of larger fibers in conjunction with relatively larger average spacings may be advantageous.

A flange member having elastic properties may be important to its operation. Elastic flange members may be formed from various materials. For example, the flange member may be formed from a synthetic open-cell foam material, or from a fabric-like material consisting of metallic fibers cemented together with an elastic binder. Metallic strands or fibers of bronze, brass or steel may be employed for this purpose. The fiber element of the flange member may also comprise fibers of a polymeric material such as polytetrafluoroethylene. Due to the continuous flooding of the flange member with oil, the elastic properties of the flange member may be altered over an extended period of use.

Internally, the flange member may include a plurality of generally axially disposed passages, each of which intersects with at least one generally radially disposed passage to form a network or labyrinth-like system of passages within the flange member. Openings into the internal network are located on the radial faces of the flange member. The generally radially disposed passages terminate as openings on the outer circumferential surface of the flange member.

When the shaft is at rest, the passages contain air as well as an irregular distribution of fine oil droplets which adhere to the individual walls of the flange passages. Upon activation of the shaft and increasing shaft speed, the oil droplets and the air are increasingly transported to the outer zones of the flange, and are ultimately thrown off from the outer circumference of the flange member. During the rotation of the shaft the flange is refilled with an oil-air mixture which is suctioned from the space (15) through the openings (14) in the clamp (13) and into the labyrinth-like passages within the flange.

The rapid rotary motion of the flange causes segregation of the inlet oil-air mixture into an oil component and an air component within the network of passages. That is, upon entering the network, oil droplets are rapidly deflected toward the outer circumference of the flange, while air is retained within the flange for a longer period of time. As a result, two streams of material through the flange are produced. The first stream, which will be located in an area of the flange closest to the inlet end, will consist predominantly of oil. The second stream will consist predominantly of air, and will be located in an area of the flange closer to outer ring projection (19). The segregation of the air and oil components within the flange member is shown in FIG. 1 by the black arrow, which represents the flow of oil through the flange member, and the white arrow which represents the flow of air through the flange member.

The ratio of the air to oil in the segregated streams is dependent on the rotational speed, and on the dimensions and the type of void system within the flange. This ratio will also be a function of the properties and viscosity of the liquid contained in the mixture. With respect to a specific seal design, it is necessary to match various parameters in an individual case to obtain the desired sealing effect. Certain basic considerations, however, facilitate the decision with respect to the particular design of the flange member and seal of this invention.

By increasing the axial length of the flange member, particularly good segregation can be insured and thereby a particularly good seal results. However, when adjusting the length of the flange member, it should be noted that adequate lubrication must always be provided between the radial projection (19) of the outer ring and the opposing face of the flange member. This requirement is met by a thin oil film which, during operation, completely covers the face of the flange member which opposes the projection of the outer ring. It should also be noted that the flange member should be only slightly biased against the outer ring projection, so that there is only slight frictional contact during shaft rotation. The development of a gap between the flange member and outer ring projection is undesirable. However, it has no detrimental effect on the sealing action when the shaft is standing still or during shaft rotation, so long as a certain maximum width is not exceeded. The width of the gap which may be tolerated increases as the rate of rotation of the shaft increases.

If a flange member with a void structure which is distributed completely homogeneously is used, it may be advantageous to relatively reduce its axial length in the region of the outer circumference of the flange in order to obtain a uniform cross-sectional profile of the voids in all existing diameters. In this case, it is advantageous to make the end face of the flange member which contacts the radial projection of the outer ring essentially planar, while the end face of the flange member facing inwardly of the sealed space is essentially conical in shape. All outside surfaces can be essentially open so as to provide egress for the oil droplets and the air.

The flange member itself may have a rigid or a flexible form. The flange member may simply rest upon and slidably engage the inner ring. A pin or a transition piece in the form of a membrane may be employed as a driver for transmitting the rotary motion of the shaft to the flange. The transition piece is connected on one side to the inner ring, and on the other to the flange.

Under operating conditions, due to the dynamic forces exerted on the flange member by the air and oil mixture passing through it, the flange member may automatically rest against the opposing surface of the radial projection of the outer ring. When the flange is formed from an elastic material, the flange may be shifted toward the outer ring projection until the desired contact pressure is obtained, and then secured in place against slippage by a locking ring on the inner ring. This insures the proper relationship between the two members when the shaft is at rest, as well as when the shaft is rotating.

At very high shaft speeds, for instance, in the order of 10,000 revolutions per minute, in conjunction with relatively large shaft diameters, undesirable deformations, and, in particular, an expansion of the diameter of the flange member can occur. Such deformations do not effect the seal if the development of a gap between the flange member and the inner ring is prevented. This can be accomplished in a simple manner by joining or cementing the flange member to the inner ring or by providing a splash ring resting against the end face of the flange member facing inwardly of the casing, with a diameter which is slightly larger than the inner diameter of the radially-inwardly directed projection of the outer ring.

In all embodiments of the seal, the tension of the ring spring (11) which biases the lip seal (4) against the outer ring is adjusted so that when a predetermined shaft rotation speed is reached, centrifugal forces will cause the sealing lip (12) to lift from the surface of the outer ring. Thus, when a particular shaft rotation speed is reached, a gap will be formed between the sealing lip and the outer ring. The shaft speed at which this gap is formed is determined with reference to the shifting of the seal during the initial rotation of the shaft, from the lip seal (4) to the flange seal (3). When the shaft is at rest, oil may collect in the vicinity of the lip seal. As the shaft begins to rotate, the oil is circulated back through the flange member which, as discussed above, functions as a seal when the shaft is rotating. Thus, the sealing lip is adjusted to lift from the outer ring after the oil, which has collected in the vicinity of the lip seal when the shaft was at rest, has been transferred back through the flange member, and after the flange member has begun to operate as a seal. Generally, the lip seal is adjusted to lift from the surface of the outer ring at shaft rotations of about 1,000–3,000 revolutions per minute.

Figure 2:
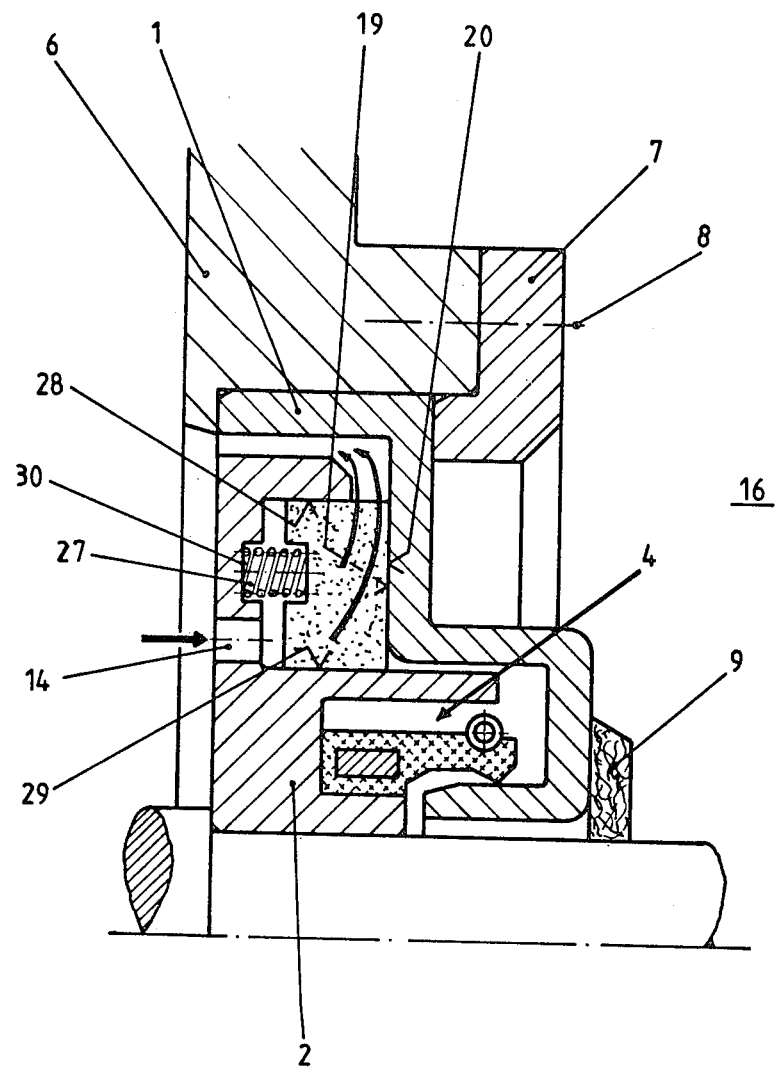
FIG. 2 is a partial longitudinal-sectional view of an embodiment of the seal having an inelastic flange which is pressed by springs against a radially-inwardly projecting leg of the outer ring.

FIG. 2 illustrates an embodiment of the seal having a shorter overall length than the embodiment of FIG. 1.

The sealing lip (12) is arranged on the side of the inner ring (2) facing the exterior of the housing.

The flange member (3) employed in the embodiment of FIG. 2 may consist of an inelastic body which is pressed by means of soft springs (27) against a projection (20) of the outer ring (1). Also in this embodiment the suction inlets (14) are distributed uniformly over the innermost face of the inner ring (2). The inlets (14) feed a uniform stream of the air-oil mixture to the flange member.

The inner ring (2) and the flange member (3) have opposing recesses (3) which are distributed uniformly over their opposing faces. Soft springs (27) are received by the recesses (30) and function to press the face (20) of the flange member (3) against the surface (19) of the outer ring (1). The springs impart an extraordinarily permanent elasticity to the seal, which renders the embodiment of FIG. 2 particularly well suited for applications where large shaft vibrations are anticipated. The springs also function to transmit the rotary motion of the shaft to the flange member.

The flange member (3) is also supported by a circular guide surface (28) of the inner ring (2). The support provided by circular guide (28) prevents the undesirable radial deformation of the flange member even at very high shaft rotation speeds.

The rigid flange member employed in the embodiment of FIG. 2 may consist of regularly or irregularly shaped particles of plastic. The particles may be bound together with a cement, epoxy, etc., to form the flange member. Particularly suitable plastics are the polyamides or polytetrafluoroethylene. Alternatively, metallic particles such as bronze, steel, brass, tin, or mixtures of different metallic particles may be employed. The metallic particles may be welded or cemented together. The smallest diameter of the particles should correspond to a value of about 0.5 times the largest diameter. The largest particle diameter should be in the range of from about 0.3 to about 1 mm and preferably from about 0.5 to about 0.8 mm.

In order to prevent the clogging of the internal void system, it may be useful in many instances to cover the surface of the flange through which the air-oil mixture enters, with a layer of particles which have a somewhat smaller mean grain size than those which comprise the body of the flange. Moreover, clogging may be avoided by covering the innermost face of the flange with a thin woven or fabric layer of a material which is inert with respect to the medium to be sealed.

In order to simplify the cleaning of the flange member, the flange member may be constructed so that it can be disassembled. For example, the flange member may comprise a cage of PTFE which defines the outside surface of the flange member and contains a loosely piled bed of plastic or metallic particles. The cage should be packed so that a rigid mutual bracing of the particles is obtained when the housing cover (7) is secured in place.

Alternatively, the flange member may consist of a plurality of flat circular washers which are threaded to, and evenly spaced along, the inner ring. The washers include a plurality of openings extending in the axial direction. The washers may be formed from metal or plastic and depending on their strength may be from about 0.1 to about 1 mm. thick. The spacing between the washers may correspond to the washer thickness. The diameter of the openings can assume values five to ten times the spacing.

In order to prevent vibrations, the washers can further be braced by bosses uniformly distributed over the entire area, assuming, of course, that the first and the last washer are made relatively stiffer. This can be accomplished by increasing the thickness of the washer, or by changing the choice of the material, or by bolting the washers together. The bosses also have a positive effect on the flow conditions during the passage of the sealed off mixture through the flange. In order to enhance the effect, it is advantageous to roughen the surface of the washers, for instance, by a sand blasting process.

Figure 3:
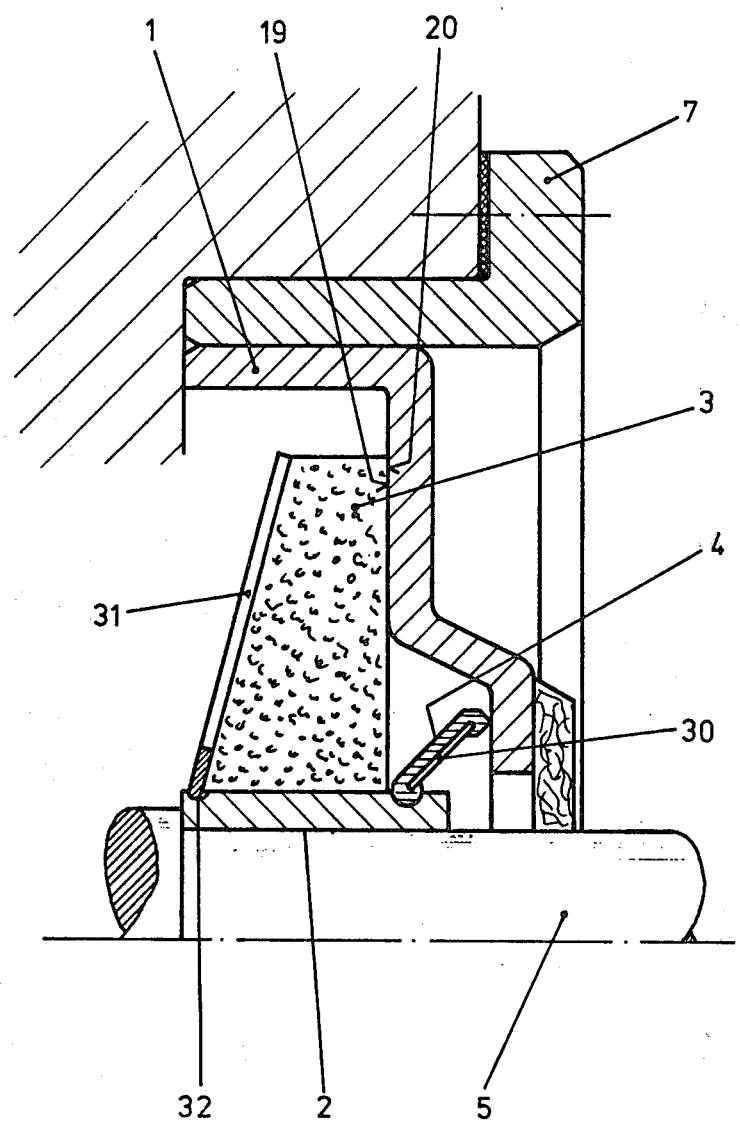
FIG. 3 is a partial longitudinal-sectional view of an embodiment of the seal in which the flange is pressed by a cup spring against a radially-inwardly pointing leg of the outer ring, and the sealing lip rests against a radially extending projection of the outer ring.

FIG. 3 illustrates a simplified embodiment of the seal, in which the lip seal (4) and a face of the flange member rest against parallel radially oriented surfaces of the outer ring (1). The bias of the lip seal (4) against the outer ring is effected by a cup spring (30). The outer ring is positioned in the cover (7) by a pressed fit.

The flange member (3) consists of a flexible material such as a non-woven fabric material or a relatively soft plastic material. The flange member may also be formed from a foam material or from sintered-together plastic particles. The flange member is pressed against the contact surface (20) of the outer ring (1) by a very soft cup spring (31). The cup spring (31) is braced in a slot (32) of the inner ring, and its outer diameter corresponds approximately to the outer diameter of the flange member.

Besides the rectangular profile of the cup spring shown, other profiles may be employed. For example, cup springs having a round profile may be employed. However, if flexible materials are employed to form the flange member (3), the relative spacing of the individual turns of the cup spring must not be larger than its minimum axial thickness. If cup springs of metal strips with a round profile are employed, relatively more turns must be provided than for the cup spring of the embodiment illustrated in FIG. 3.

The seal illustrated by FIG. 3 employs a fewer number of component parts than the embodiments disclosed by FIGS. 1 and 2. It can, therefore, be manufactured particularly inexpensively. Moreover, it has the shortest overall length, and the relation of the lip seal to the corresponding counter-surface insures absolute reliability during operation even if the assembly is operated carelessly. A still further advantage is that the dammed-up oil which accumulates at the lip seal (4) when the shaft is at rest is reliably transported back through the flange member while the shaft is rotating. When an internal pressure in the sealed housing of the order of about 200 mm of water is reached, the transport effect from the area of the lip seal back through the flange comes to a stop. At this point only the oil and air from the inner housing continues to flow through the flange member.

Figure 4:
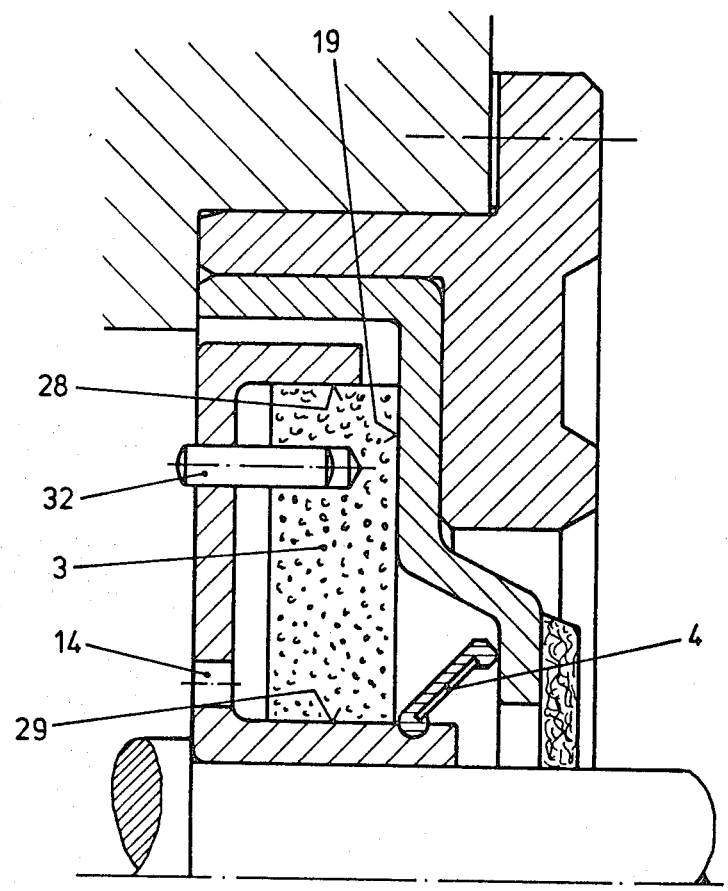
FIG. 4 is a partial longitudinal-sectional view of an embodiment of the seal in which the flange is in the form of a ring piston, which is engaged by a slot in the inner ring.

FIG. 4 illustrates another embodiment of the seal. As shown by FIG. 4, the lip seal and the flange member rest against parallel surfaces of the outer ring (1). The lip seal is constructed similarly to the embodiment of FIG. 3. The flange member may comprise a material which is both stiff and porous. The flange member resembles a piston ring, and is secured within a slot in the inner ring. The size of the gap in the inner ring defined by the guide surfaces (28),(29) is adjusted so that the flange member can be moved freely in the axial direction.

The rotary motion of the shaft is transmitted to the flange member (3) by one or more cylindrical drive pins (32) which are forceably engaged by a hole in the inner ring and are received by a corresponding hole in the flange. The size of the pin-receiving hole in the flange member may be adjusted to be slightly larger than the pin so that there is some play within the hole. The inner ring is provided with a plurality of inlets (14) through which the oil and air are suctioned.

The flow of the air-oil mixture and segregation of the oil and air mixture by the flange member is accomplished in the manner described above with reference to the discussion of the embodiment of FIG. 1. The force exerted by the mixture of the projection in the axial direction is sufficient to insure reliable contact between the end face of the flange and the surface (19) of the outer ring. Therefore, the flange-engaging springs are not employed.

This invention has been described in terms of specific embodiments set forth in detail herein. It should be understood, however, that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed embodiments are considered to be within the scope of this invention and the following claims.

I claim:

1. In a seal for the gap between a rotatable shaft and the bore of a housing, which housing encloses a medium to be retained in said housing, said medium comprising a finely divided liquid entrained in a gas, wherein an inner ring is secured to the shaft and an outer ring is secured to the bore of the housing in a liquid- and gas-tight manner, and having a radially-movable, ring-shaped sealing lip secured to said inner ring and biased into contact with a surface of said outer ring, the improvement which comprises a flange means secured to said inner ring at a point between the medium to be retained and the sealing lip; said flange means having an inner end face, an outer end face, and an outer circumferential surface, said outer end face of said flange means being biased into contact with a ring-shaped surface of said outer ring, said flange means also having openings distributed over the inner end face of said flange, which openings are connected by passages extending generally axially through said flange means, said flange means further having a multiplicity of openings on said outer circumferential surface which openings are connected to said axial passages by passages extending in a generally radial direction.

2. The seal according to claim 1 wherein said outer ring means includes a ring-shaped surface and said outer end face of said flange means is biased into contact with said ring-shaped surface of said outer ring means; said inner ring means includes a ring-shaped surface having needle means which extend axially from said ring-shaped surface into said flange means, said ring-shaped surface of said inner ring means also having a plurality of openings which communicate with said openings in the outer end face of said flange means.

3. The seal according to claim 1 wherein said outer end face of said flange means contacts said ring-shaped surface of said outer ring means, and said inner end face of said flange means opposes a ring-shaped surface of said inner ring means; said ring-shaped surface of said inner ring means having openings which communicate with openings in said inner end face of said flange means, and also having a recess which opposes a recess in said inner end face of said flange means, wherein means are mounted in the space defined by said opposing recesses for biasing the outer end face of said flange means into contact with said ring-shaped surface of said outer ring means.

4. The seal according to claim 1 wherein said outer end face of said flange means contacts said ring-shaped surface of said outer ring, and said inner end face of said flange means is engaged by cup spring means secured to said inner ring means, wherein said cup spring means bias the outer end face of said flange means into contact with said ring-shaped surface of said outer ring.

5. The seal according to claim 1 wherein said inner end face of said flange means opposes a ring-shaped surface on said inner ring means, said ring-shaped surface having a plurality of openings, and also having pin means which extend axially from said ring-shaped surface into said flange means and bias said outer end face of said flange means into contact with said ring-shaped surface of said outer ring means.

6. The seal according to claims 3 or 4, wherein guide surface means are secured to said ring-shaped surface of said inner ring, and extend axially from said ring-shaped surface and engage said outer circumferential surface of said flange means.

7. The seal according to claim 1 wherein said flange is comprised of a plurality of members bonded together to form a network of voids within said flange, said flange forming members being incapable of absorbing said liquids.

8. The seal according to claim 7 wherein said flange is comprised of bonded together shaped plastic or metallic particles wherein the smallest diameter of said particles corresponds to a value of at least about 0.5 times the largest diameter.

9. The seal according to claim 8 wherein the largest of said particles has a diameter of from about 0.3 to about 1 mm.

10. The seal according to claim 8 wherein the diameter of the particles about the surface of said flange through which said liquid and gas enters the void network of said flange, is smaller than the diameter of the particles which form said inner void network.

11. The seal according to claim 9 wherein said particles are selected from the group consisting of particles of brass, tin, bronze or polytetrafluoroethylene.

12. The seal according to claim 7 wherein said flange is formed from a plurality of fibers, said fibers having a diameter of at least about 0.03 mm.

13. The seal according to claim 12 wherein the diameter of the fibers about the surface of said flange through which said liquid and gas enters said void network is smaller than the diameter of the fibers which form said void network.

14. The seal according to claim 12 wherein said fibers are selected from the group consisting of the fibers of brass, steel, polyester, or polytetrafluoroethylene.

15. The seal according to claim 7 wherein said flange is comprised of a plurality of spaced apart perforated washer means wherein said washer means are mounted on said inner ring.

16. The seal according to claim 15 wherein said washer means are formed from bronze, brass, steel, polyamide or polytetrafluoroethylene.

17. The seal according to claim 1 wherein said flange is formed from a synthetic open pore foam material.

* * * * *